United States Patent Office 3,136,676
Patented June 9, 1964

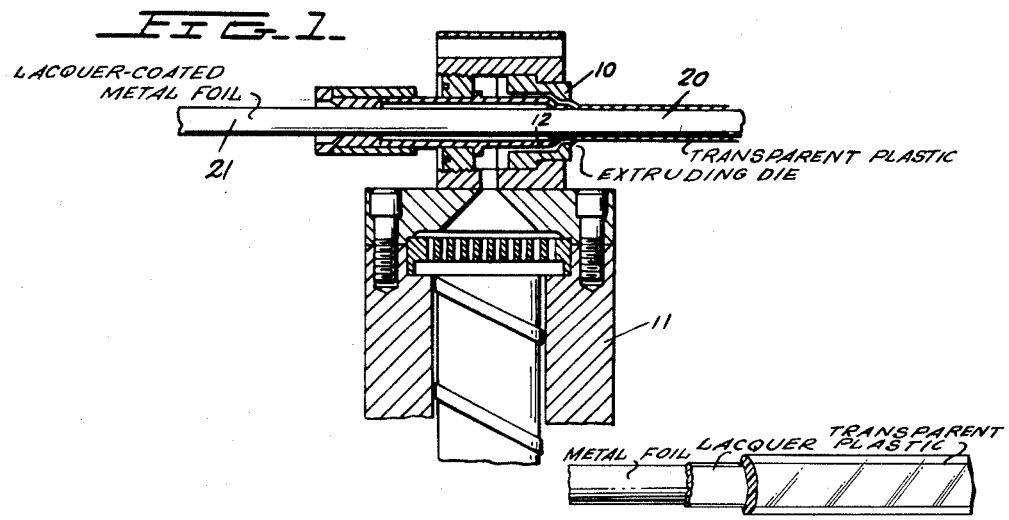

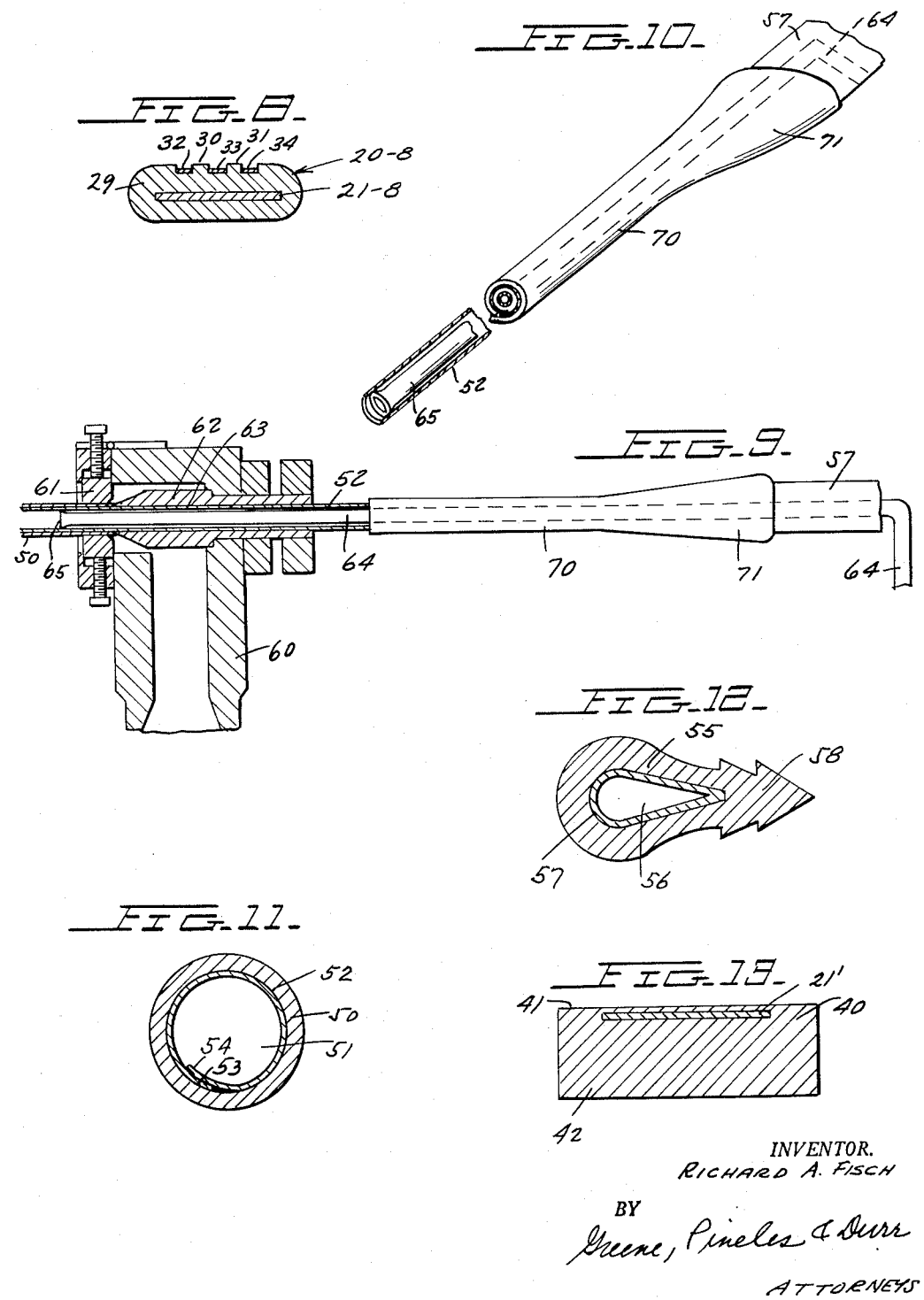

3,136,676
METALLIZED PLASTIC EXTRUSION PRODUCTS AND METHOD OF MAKING SAME
Richard A. Fisch, Forest Hills Gardens, N.Y.; Hilde Fisch, Willie Schloessinger, and William Guggenheimer, executors of Richard A. Fisch, deceased, assignors to Anchor Plastics Company, Inc., Long Island City, N.Y., a corporation of New York
Filed Feb. 20, 1957, Ser. No. 641,358
5 Claims. (Cl. 156—244)

This invention relates to the production of metallized effects in extruded transparent thermoplastic products.

This application is a continuation-in-part of U.S. application Serial No. 497,948, filed March 30, 1955, now abandoned.

Processes of producing extruded thermoplastic materials with embedded reinforcing wires or strips are well known. Transparent or translucent plastic product which have a light-reflecting, metal-like region due to a thin coating of metal on an inside or outside surface are also known. When it was attempted to obtain a metal-like appearance in a plastic extruded product by embedding a metal foil therein, however, it was found that the inserted foil wrinkled so as to give the effect of an inferior product such as might be caused by distortion of the plastic or foil during extrusion or subsequent bending or flexing or by only loosely associating the foil with the plastic.

Among the objects of this invention is to provide a thermoplastic extrusion product with a light reflecting metallic effect in at least a portion thereof which metallic effect is not removed or injured by scratching or rubbing the surface of the plastic.

Among other objects of the invention is to provide an extrusion product comprising transparent thermoplastic material containing embedded therein, a thin, embossed, highly reflective metallic foil.

Among other objects of the invention is to provide a method of continuously embedding a metallic foil in transparent thermoplastic extrusion products of various cross sectional shapes so as to provide the product with a metallic effect and with an embedded foil which is substantially free from wrinkling and similar defects so that the foil appears as a smooth adherent layer in the interior of the plastic product.

It has heretofore been concluded that metallic foils were too distortable and of too delicate a nature to be embedded in plastics without distortion. Said prior application Serial No. 497,948 is based on the discovery that wrinkling of a thin metallic foil which is embedded in a thermoplastic during extrusion could be prevented by modifying the foil insert so as to permit one side thereof to move with the plastic more freely than the opposite side. It was found that in the ordinary process of extrusion with a delicate foil insert, some parts of the embedded foil adhered more to the thermoplastic layer on the front side thereof whereas other parts of the foil adhered more securely to the thermoplastic layer on the rear side thereof and when shrinkage or flexing of the plastic occurred, wrinkles due to different tensions were formed in the foil. According to one modification of said prior application, this undesired effect is overcome by embedding a laminated foil having two or more layers so that one layer of the foil can slip with respect to the other layer of foil while the outside surface of the foil adheres to the plastic. According to a second modification the undesirable wrinkling is overcome by applying an adhesive layer to one side of the foil to be embedded.

It has now been found that it is possible to apply a thermoplastic adhesive to one or both sides of the foil to be embedded so that the said one or both sides of the foil are very securely adhered to the plastic material and will not wrinkle during or after the extrusion even when the extruded product is severely distorted.

One difficulty connected with securing adhesion between the foil and the plastic is that the foil as it is received contains a very thin layer of oil or lubricant which has been applied during the manufacture thereof. Foils which have been treated to remove the lubricant can be ordered but even such foils contain a residual amount of the lubricant. If the adhesive which is applied to the foil is to be very effective, it must be one which is capable of absorbing or overcoming the non-adhesive effects of the lubricant film. Very satisfactory adhesives which act as adhesives between the foil and plastic in spite of the residual lubricant or oil on the foil are lacquers with a nitrocellulose base. Cellulose butyrate lacquers and vinyl acetate-vinyl chloride copolymer lacquers are also satisfactory.

The extruded product may be of any configuration. Where the products are tubular or hollow, the entire inside of the tubular or hollow portion may be lined with the adherent foil. Thus, even though the metallic portion is only a foil, such tubular products act effectively as electromagnetic shields in electronic devices. Where both sides of the foil are adhesively coated the edges of a foil inside a tube of plastic will be united to produce a fluid-tight metal conduit.

An additional effect is obtained when embossed foils are employed in the process. The foils may be embossed so as to emphasize the light reflecting properties (i.e., so that light is reflected in a multiplicity of directions), and/or to improve the flexibility of the foil. Such products are especially useful as highway markers. The transparent plastic may be colored, red, green, or similar colors so that the light reflected therefrom, is similarly colored. The embossed designs on said foil does not interfere with the extruding process of the invention.

The invention is especially adapted for the production of decorative mouldings, beads and trim strips for cabinets, walls and frames, panel joining strips, decorative designation strips, highway and similar danger markers, etc.

The invention both as to its organization and its method of operation together with additional objects and advantages thereof will best be understood from the following description of specific embodiments thereof when read in connection with the accompanying drawing in which FIG. 1 is a cross-sectional view of the end of a cross head type of extrusion device as it is applied to the process of the present invention.

FIGURE 1A is a partial sectional view of the article emerging from the process disclosed in FIGURE 1.

FIG. 2 is a front view of an apparatus used to carry out the process of the present invention.

FIGS. 3, 4, 5 and 6 are cross-sectional perspective views of various forms of extrusion products made according to one form of the invention.

FIG. 7 is an enlarged cross sectional view of a portion of an extrusion product made according to the invention.

FIG. 8 is a cross sectional view of another extrusion product made according to the invention.

FIG. 9 is a cross sectional view of an extruding device extruding a tube while lining the same with a metal foil.

FIG. 10 is a detail view, partially broken away, of the means for curving the foil in the extruding device of FIG. 9.

FIG. 11 is a cross sectional view of a product made by the process and apparatus of FIG. 9.

FIG. 12 is a cross sectional view of another product such as made by the process and apparatus of FIG. 9.

FIG. 13 is a cross sectional view of a modified form of product made according to the invention.

A typical cross head type of plastic extrusion apparatus is shown in FIG. 1. In such an apparatus the direction of movement of the extruded product 20 from the extrusion die 10 is at an angle (in this case 90°) to the direction of movement of the plastic material through the screw extrusion device 11.

Such a crosshead extrusion apparatus is advantageous for extruding any type of thermoplastic product containing an embedded material since the material being embedded 21 does not have to pass all the way through the screw extruder 11 and does not have to be bent in order to get to the interior of the extrusion die 10. The die 10 comprises the core 12 through which the embedding material 21 is adapted to pass. This type of extrusion apparatus itself is known and is not a part of the present invention so that details of the apparatus are not described. As an illustration, however, the embedding foil 21 is held in the form of a roll 22 and is continuously fed to the cross head die 10 of the screw extruder 11. After passing through the die, the extruded product 20 is passed through a cooling bath 13.

Depending on the shape of the die, etc., various shapes and effects may be produced by the process as illustrated in FIGS. 3-6. FIG. 3 shows a U-shaped product 20-3 of cellulose acetate containing a layer of foil 21-3 which is coated on the top surface with a layer 26 of cellulose nitrate lacquer which extends beneath substantially all of the outside surface regions of the product.

FIG. 4 shows an angle moulding 20-4 with a layer of foil 21-4 which is coated with a layer 26-4 of cellulose nitrate lacquer, extending beneath substantially the entire surface regions of the product. In these figures the thickness of the layer of cellulose nitrate lacquer is exaggerated for the sake of clarity. In the product this layer may actually dissappear and blend in with the cellulose acetate of the main body of the product.

FIG. 5 shows a moulding 20-5 having a rear planar section 23, a front planar section 24 connected by the section 25. In this product only the front section 24 contains the foil 21-5 beneath its surface. The foil 21-5 is coated with a thin layer of adhesive lacquer 26-5 which may have a base of cellulose butyrate, cellulose nitrate, ethyl cellulose, polyvinyl acetate-polyvinyl chloride.

As illustrated in FIGS. 3, 5 and 6 the foil 21-3 may be embossed. An especially useful product is obtained where the foil contains a multiplicity of minute ovate or faceted projections or depressions so as to reflect light in a multiplicity of directions.

In the product 20-6 of FIG. 6 two spaced portions thereof contain the embedded foils 21-6 containing layer 26-6 of plastic adhesive.

In FIG. 7, the product 20-7 contains a single layer of foil 121. On the front surface of the foil 121 is a layer of plastic 122 which is compatible with the plastic 123 of the product. The plastic 122 blends with the hot plastic 123 during the extrusion process and since previously to the extrusion, the foil 121 has been coated with plastic 122 so that a good and uniform adherence is obtained, the foil 121 is effectively united to the product 20-7.

In addition, or in place of the layer 122 of FIG. 7, the lubricating layer 124 of silicone resin may be applied to the rear side of the foil 121.

The width of the foil employed in the process may be from about ⅛ of an inch in FIG. 6, for example, up to six inches or more. In the specification and claims the term laminated foils will be understood to include folded foils as well as coated foils.

FIG. 8 shows in cross section, an extruded strip 20-8 containing the embedded foil 21-8 to the top surface of which (and also, if desired, to the bottom surface) a lacquer adhesive has been applied. The top surface of the plastic body 29 contains a plurality of longitudinal flutes 30, 31 and the spaces 32, 33, 34 flanking the flutes have been partially filled with paint or a pigment material.

The foil employed for such products may be any type of foil but aluminum foil is very satisfactory being easily available and having high reflectivity. The color or appearance of the product may be changed by coloring the transparent plastic material. Thus, a gold bronze or brass appearance may be obtained by coloring the plastic different shades of yellow. An unusual effect is obtained in the product 40 of FIG. 13 wherein the foil 21' is inserted close to one surface 1 of the product. When the plastic of 40 is colored a light yellow the insert 21' as seen from the surface 41 has a silvery appearance whereas the same foil 21' as seen from the surface 42 had a gold appearance.

The bodies 50 and 55 of FIGS. 11 and 12, respectively, have a hollow portion 51 or 56 therein which is lined with a metal foil 52 or 57. Each of these foils is treated on at least the one side which contacts the plastic with an adhesive lacquer solution which is not shown in the drawing. Such products may be made by the process and apparatus illustrated in FIGS. 9 and 10. In this apparatus the plastic material to be extruded is forced through cylinder 60 to die 61 which has an internal core portion 62 for forming the hollow part of the extruded product. A straight opening 63 extends through the core 62 from the die 61 to the side opposite the die 61. The foil tube 52 is fed through this opening 63. Extending through the opening 63 of core 62 is also a tube 64. This tube prevents the foil tube 52 from collapsing and admits air to the interior of the formed tube through the flared opening 65 at the end thereof. The flared end also acts to press the foil tube 52 against the inside surface of the hot extruded plastic tube to assure a union between the thermoplastic adhesive on the surface of the coil and the body of the plastic tube.

The foil tube 52 is automatically formed from a strip of film 57 by passing through the tube forming device 70 having a funnel shaped end 71 adjacent the entrance end of the foil strip 57.

Where both sides of the foil 52 have been coated with an adhesive thermoplastic lacquer, the heat and pressure applied to the foil as it passes between the flared end 65 of the tube 64 and the extruded plastic tube 50 also seals the overlapping edges 53, 54 of the foil.

The hollow strip 55 shown in cross section in FIG. 12 has a notched edge 58 adapted to be forced into a groove to provide a beaded decoration.

The following example further illustrates the process of the invention.

*Example 1*

A foil which is embossed so as to reflect light at a multiplicity of angles is sprayed on one side with a solution of cellulose nitrate lacquer. The thickness of the layer of cellulose nitrate deposited thereon may be about .001% or less, for example. This foil is fed to an extrusion apparatus such as shown in FIG. 1 with the coated surface facing in such a direction as to be adjacent the front surface of the product to be extruded. A reflective extruded strip without wrinkles or distortions in the embedded foil is obtained. When the plastic is dyed red prior to extrusion a bright red reflection is obtained in the finished product when a light is cast upon the product.

The surface of the foil may be scratched to produce a burnished effect in the finished product. A satin effect may be obtained by brushing or frosting the surface of the plastic. Various combinations of foil treatment and plastic surface treatments may be applied.

The adhesive may be applied to the front surface and to the rear surface of the foil.

The features and principles underlying the invention described above in connection with specific exemplifications will suggest to those skilled in the art many other

I claim:
1. In the process of preparing extruded thermoplastic products with at least one visible region thereof having a metallic appearance, the steps comprising
   providing a metal foil having a thin, film-like coating of a transparent thermoplastic lacquer of the group consisting of cellulose nitrate, cellulose butyrate, ethyl cellulose, and polyvinyl acetate-polyvinyl chloride lacquers on at least one surface thereof,
   extruding a transparent thermoplastic material about the lacquer-coated foil while feeding the foil in unison with the thermoplastic material with the surface of the foil containing the lacquer coating contacting the interior surface of the extruded material whereby the lacquer-coating of the foil adhesively fixes the position of the latter with respect to the extruded material.
2. The process as set forth in claim 1 in which the metal foil is an embossed foil containing a multiplicity of facets adapted to reflect light in various directions.
3. The process as set forth in claim 1 in which the metal foil comprises a layer of said thermoplastic lacquer on the surfaces of both sides thereof and in which the thermoplastic material is extruded to contact both lacquer-coated sides of said film.
4. In the process of preparing extruded thermoplastic products with at least one visible region thereof having a metallic appearance, the steps comprising
   providing a metal foil having a thin, film-like coating of transparent cellulose nitrate lacquer on at least one surface thereof,
   extruding a transparent thermoplastic material about the lacquer-coated foil while feeding the foil in unison with the thermoplastic material with the surface of the foil containing the lacquer coating contacting the interior surface of the extruded material whereby the lacquer-coating of the foil adhesively fixes the position of the latter with respect to the extruded material.
5. In the process of preparing extruded thermoplastic products with at least one visible region thereof having a metallic appearance, the steps comprising
   providing a metal foil having a thin, film-like coating of transparent cellulosic lacquer on at least one surface thereof,
   extruding a transparent thermoplastic material about the lacquer-coated foil while feeding the foil in unison with the thermoplastic material with the surface of the foil containing the lacquer coating contacting the interior surface of the extruded material whereby the lacquer-coating of the foil adhesively fixes the position of the latter with respect to the extruded material.

References Cited in the file of this patent

UNITED STATES PATENTS

| Number | Name | Date |
|---|---|---|
| 1,501,764 | Flint | July 12, 1924 |
| 1,541,528 | Royle | June 9, 1925 |
| 2,020,007 | Wagman | Nov. 5, 1935 |
| 2,199,526 | McCowen | May 7, 1940 |
| 2,205,518 | Duffy | June 25, 1940 |
| 2,227,991 | Winklemann et al. | Jan. 7, 1941 |
| 2,284,866 | Hansson | June 2, 1942 |
| 2,344,575 | Warren | Mar. 21, 1944 |
| 2,401,551 | Cook | June 4, 1946 |
| 2,524,829 | Perzel | Oct. 10, 1950 |
| 2,632,722 | Libberton | Mar. 24, 1953 |
| 2,653,118 | Seymour | Sept. 22, 1953 |
| 2,669,754 | Chadbourne | Feb. 23, 1954 |
| 2,732,020 | Scholl | Jan. 24, 1956 |
| 2,758,045 | Heaton et al. | Aug. 7, 1956 |
| 2,774,811 | Shanok et al. | Dec. 18, 1956 |
| 2,808,995 | Degman | Oct. 8, 1957 |
| 2,818,363 | Woolley | Dec. 31, 1957 |
| 2,926,415 | Griffin | Mar. 1, 1960 |
| 2,979,431 | Perrault | Apr. 11, 1961 |